April 14, 1970 J. HALABY 3,506,791

TELEPHONE SYSTEM FOR DIRECTING CALLS TO PERSONS INSTEAD OF STATIONS

Filed Jan. 16, 1967 6 Sheets-Sheet 1

INVENTOR.
JOSEF HALABY

BY

Roberts + Cohen
ATTORNEYS

April 14, 1970 J. HALABY 3,506,791

TELEPHONE SYSTEM FOR DIRECTING CALLS TO PERSONS INSTEAD OF STATIONS

Filed Jan. 16, 1967 6 Sheets-Sheet 2

INVENTOR.
JOSEF HALABY

BY

Roberts + Cohen

ATTORNEYS

INVENTOR.
JOSEF HALABY
BY
Roberts & Cohen
ATTORNEYS

INVENTOR.
JOSEF HALABY
BY
Roberts & Cohen
ATTORNEYS

INVENTOR.
JOSEF HALABY

BY

Roberts & Cohen
ATTORNEYS

INVENTOR.
JOSEF HALABY
BY
Roberts + Cohen
ATTORNEYS

United States Patent Office 3,506,791
Patented Apr. 14, 1970

3,506,791

TELEPHONE SYSTEM FOR DIRECTING CALLS TO PERSONS INSTEAD OF STATIONS

Josef Halaby, 1406 New York Ave., Brooklyn, N.Y. 11210

Filed Jan. 16, 1967, Ser. No. 609,374
Int. Cl. H04q 7/04
U.S. Cl. 179—41 15 Claims

ABSTRACT OF THE DISCLOSURE

A method is disclosed according to which telephone calls are made to persons rather than to stations. To practice this method, a system is disclosed in which an incoming call received by a central station causes the wireless transmission of a signal identifying the person being called. This person wears a transceiver which alerts the person to the fact that he is being called. He then goes to any one of a number of special telephones which are actuated by the person's transceiver to control a selector to connect the incoming call to the telephone thusly approached.

BRIEF SUMMARY OF INVENTION

According to the invention, there is proposed a method in accordance with which telephone calls are addressed to persons instead of to stations, and wherein a thusly addressed telephone call initiates a selectively characterized signal to alert a particular person to the fact that he is being called. This method, moreover, involves providing a plurality of telephones or other such communication means within a determined zone and distributed such that an alerted person may go to any such communication means to receive the indicated call. Moreover, the method involves the feature whereby the thusly alerted person may actuate any one of said communication means simply by approaching or using the same.

In general, a communication system of the invention comprises a central means for the distribution of incoming and perhaps inter-office communications, said central means including means for transmitting a signal identifying a person for whom an incoming communication is intended. Means are provided which are physically associated with the various persons for whom calls may be received and these are selectively actuated to alert the particular person for whom an incoming call is intended. As noted above, a plurality of communication means are distributed throughout a determinable zone such as a factory, office, hospital, or the like, and means are provided to enable one of the communication means to receive the incoming communication.

According to a feature of the invention the various persons to whom calls can be placed are provided with respective transceiver means which may be worn, for example, in the manner of a wristwatch. These transceiver means will be responsive to a particular identifying signal for alerting the associated person to the incoming call by, for example, visual and/or audio means.

As a further feature of the invention, enabling means associated with the communication means may be actuated by the proximate transceiver means or by a switch, or both.

The transceiver and enabling means provided in accordance with the invention may have effective coupling ranges between about one and ten feet. Therefore, a person wearing a transceiver as noted above will be able to actuate only one telephone or other such device at a time provided that these are adequately distributed.

Another feature of the invention resides in the provision of a selector means selectively coupling the telephone, or other such devices, to the central station in such a manner that the proper incoming communication is received. Such selector means may be, as described in greater detail hereinafter, an electromechanical device or an electrical or electronic matrix.

DETAILED DESCRIPTION

Figure 1:
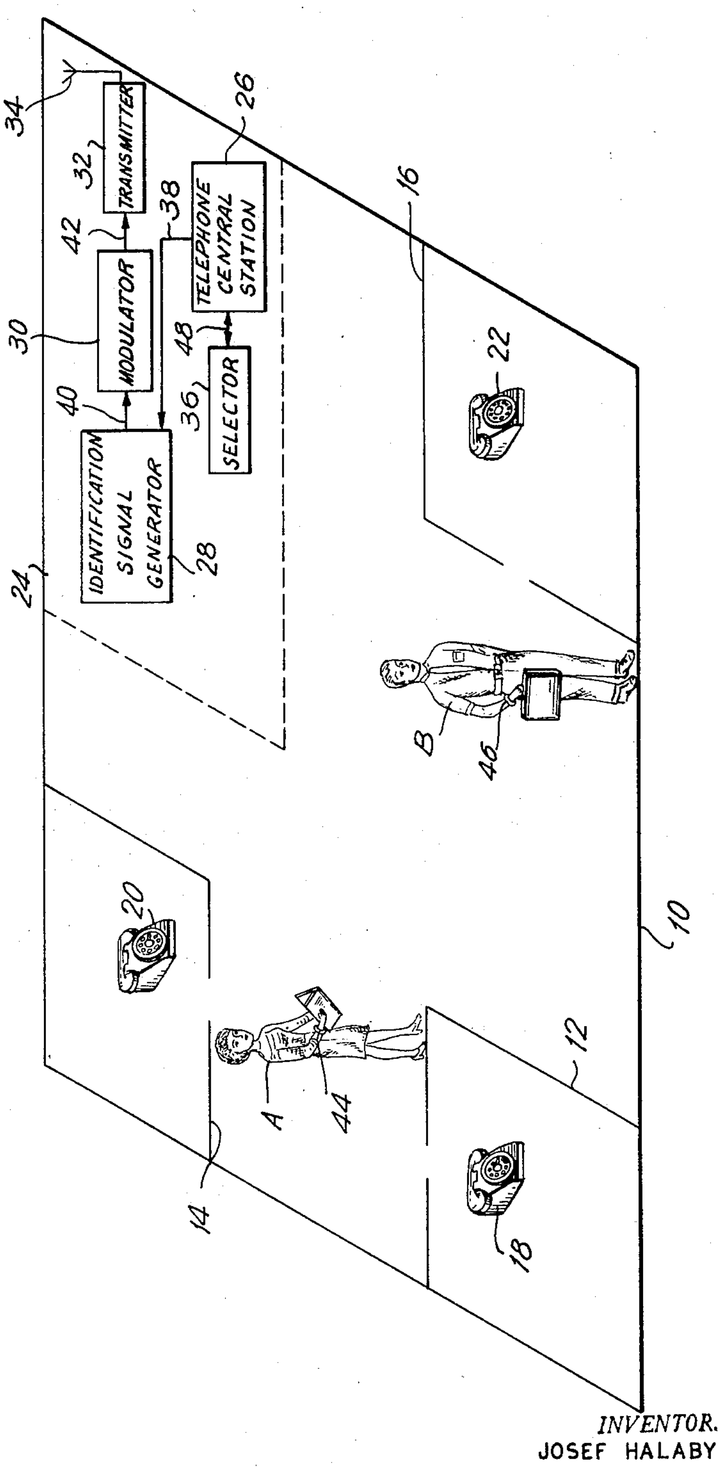
FIGURE 1 is a diagrammatic perspective view of a determined zone such as an office in which is accommodated a central station arrangement as provided in accordance with the invention for communicating selectively with telephones distributed throughout the office.

This invention relates to communication systems and methods, and more particularly to telephone systems comprising a plurality of receiving stations.

In conventional telephone systems which are discussed hereinafter below, by way of example and not limitation, a telephone call is generally addressed to one of a plurality of stations and not to a particular person. Thus, if one wishes to call a particular person, he identifies in his mind the physical location at which he is most likely to find the person, and then he directs a telephone call to a telephone receiver or station located thereat. If the person to whom the telephone call is directed is not at that particular station, the call will not be completed and a further telephone call will have to be made if other alternative locations are known. This involves a great waste of time and is as well uneconomical in the wasted usage of both power and equipment.

In accordance with the invention, provision is made for directing telephone calls to specific persons preferably, although not necessarily, in a limited area or zone such as a factory, office, hospital, or the like. A preferred arrangement for so doing is illustrated in the drawing and is next described in detail below by way of illustration.

In FIG. 1 is illustrated a zone or area 10 in which are located a plurality of rooms such as indicated at 12, 14 and 16. Persons A and B are free to roam about as they wish in zone 10 and thus are considered as having arbitrary locations in said zone. The number of persons illustrated is exemplary only and the system is intended to cover substantially as many persons as need be accommodated within the system.

In the rooms 12, 14 and 16 are located one or more telephones such as indicated by way of example at 18, 20 and 22. These telephones comprise the conventional elements of known telephones, but are further modified as will be explained in greater detail hereinbelow.

In a zone 24 appears a telephone central station 26, and identification signal generator 28, a modulator 30, a transmitter 32, an antenna 34 and a selector 36. An incoming call received either from outside of the zone 10 or from one of the telephones 18, 20 and 22 indicated hereinabove will be effective in central station 26 to cause a signal to be transferred via line 38 to signal generator 28. Signal generator 28 will generator a signal identifying the person for whom the call is intended and such signal will be transferred via line 40 to modualtor 30 whereat a carrier signal will be modulated, transferred via line 42 to transmitter 32 and thence conventionally transmitted throughout zone 10 via antenna 34.

Each of the persons, e.g., persons A and B in zone 10, will have physically associated therewith a transceiver such as indicated at 44 and 46. These transceivers can conveniently be provided with wrist straps for being mounted on the wrists of the various persons involved but many other forms are possible such as, for example, shirt pocket transceivers, transceivers adapted for being hooked on belts, pinned to lapels, and so forth. The physical form which such transceivers take does not limit this invention in any manner. However, it is preferred that a physical relationship be provided between the persons involved and their transceivers such that the transceivers will be with such persons at all times while in the zone 10.

The signal transmitted via antenna 34 will be selective to one of the aforesaid transceivers which, as will be described in greater detail hereinafter, include audio and/or visual indicator means which will alert the corresponding person to the fact that an incoming call has been received for him. The thusly alerted person will then arbitrarily go to any one of the specially prepared telephones in zone 10 and his use of that telephone along with a signal transmitted by the associated transceiver will actuate the thusly approached telephone to cooperate with selector 36 so that the incoming telephone cell will be transmitted via line 48 through the selector 36 to the thusly employed telephone. For example, if person A is alerted by his transceiver 44 that a telephone call has been received for him at central station 26, he may go to any one telephones 18, 20 and 22. In a manner which will be further detailed hereinafter, his use of the telephone will cause selector 36 to enable the communication to be transferred via the selector to the particularly employed telephone.

Before a detailed discussion is undertaken with the respect to the particular system involved, attention is directed to the fact that it is not actually necessary to recode the conventional telephone numbers presently being employed to identify particular stations. It is in fact possible to employ the same types of numbers to identify persons instead of stations. Alternatively, however, to show that there are few limitations to the type of coding which can be employed, it is possible for call signals to be coded to include both stations and persons. It is further possible that an incoming call be directed to a central station whereat an operator will initiate the transmission of a signal identifying the person whom the operator has been advised is intended to receive the incoming call.

Figure 2:
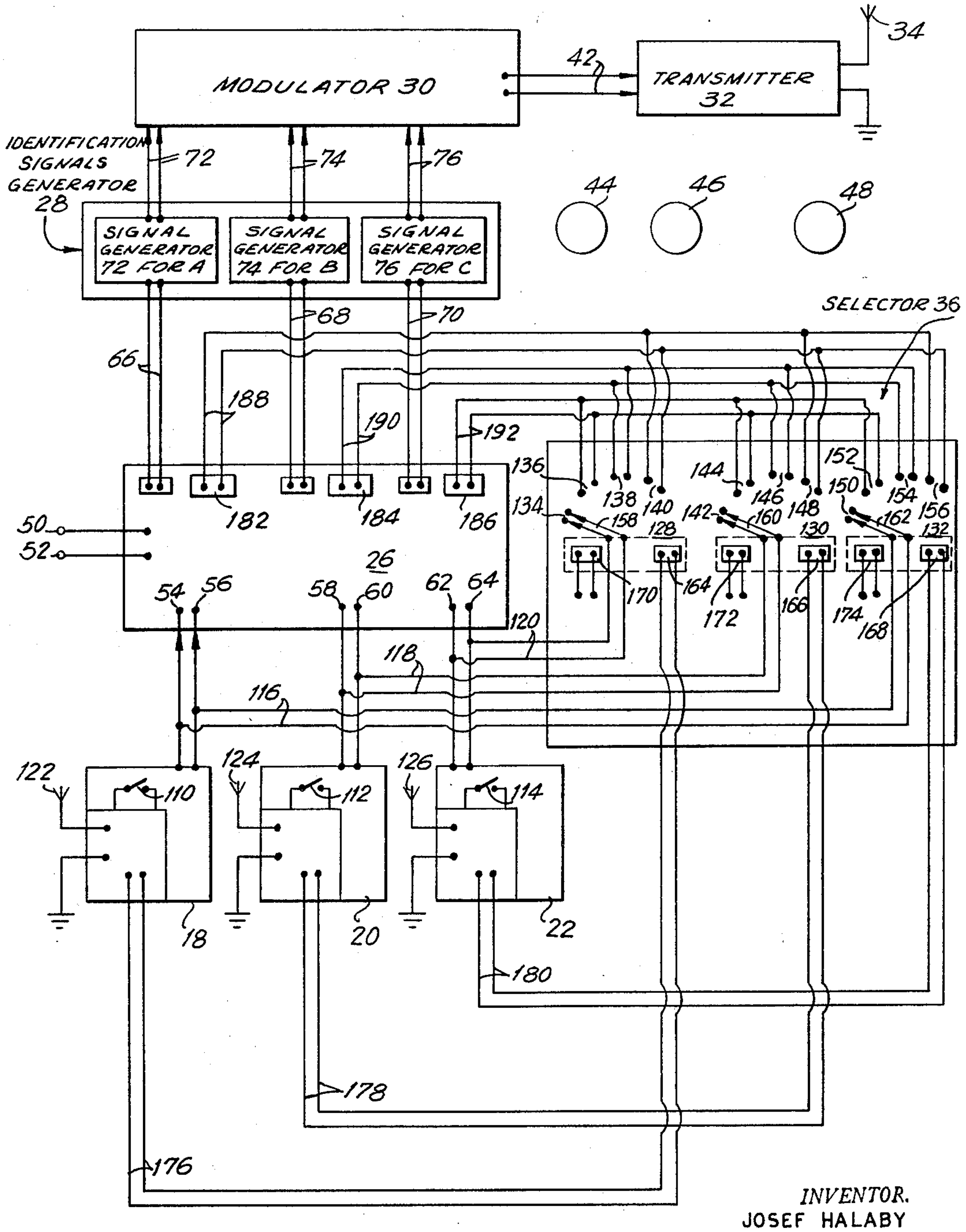
FIGURE 2 is a partially diagrammatic and partially schematic illustration of a central station and the circuits by means of which persons are alerted to incoming telephone calls and by which telephones are selectively connected to such calls.

In FIG. 2 appears the following components previously discussed in respect of FIG. 1: central station 26, identification signal generator 28, modulator 30, transmitter 32, antenna 34, telephones 18, 20 and 22, selector 36 and transceivers 41 and 46. A further transceiver 48 is also illustrated to indicate that *n* number of transceivers can be employed for *n* number of persons.

Figure 5:
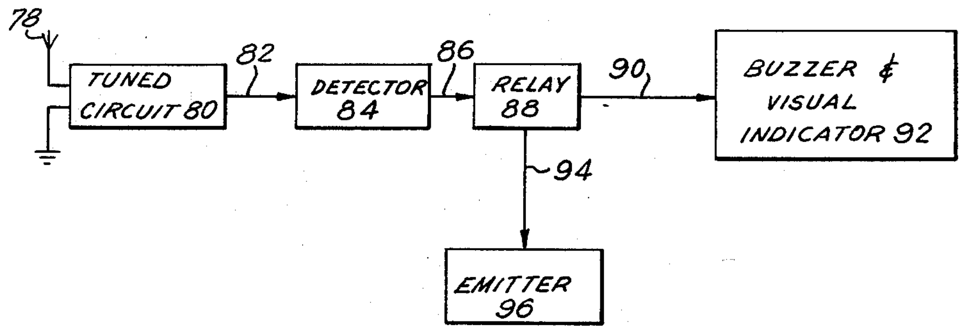
FIGURE 5 is a block diagram of a transceiver as is intended to be physically associated with persons to whom calls can be made in accordance with the invention.

The central station 26 is of conventional construction and requires no elucidation within this text for those skilled in the art. Its function is to receive incoming or inter-office telephone calls and to make these calls available for transmission to certain telephones. Terminals 50 and 52 are illustrated by way of example for the receipt of incoming telephone calls. Terminals 54, 56, 58, 60, 62 and 64 are shown by way of example for inter-office telephone calls. When an incoming or inter-office telephone call is received it will be examined for the content which heretofore was conventionally employed to select a particular station for the receipt of the incoming communication. This is now slightly modified so that instead of identifying a particular station, a signal is transmitted instead via lines 66, 68 or 70 to a signal generator 72, 74 or 76 for persons A, B or $X_n$ or C, the number of such generators being related to the number of persons encompassed within the system. The signal generator will generate a signal as described hereinafter which will be transmitted via lines 72, 74 and 76 to modulator 38 wherein a carrier signal will be appropriately modulated and transferred via lines 42 to transmitter 32 for wireless transmission via antenna 34 as noted hereinabove. This signal will be received and processed by only one of the transceivers 44, 46 or 48, the details of which appear in block diagrammatic form in FIG. 5. Referring now to FIG. 5, it is seen that each transceiver includes a receiving antenna 78 of, for example, the same type conventionally employed in transistor radios. This antenna is coupled to a tuned circuit 80 tuned to the frequency of transmitter 32. The detector will subtract identifying signal from the modular carrier. The detector is also adjusted to a frequency (identifying signal) which is assigned to the corresponding person. Only when the proper signal is received will the detector 84 pass a signal via line 86 to a miniature electromechanical relay 88. This in turn will act via line 90 to actuate an indicator 92. The indicator 92 which may be of any conventional construction preferably involves the use of a buzzer which sounds for a very short time to alert the associated person to the fact that an incoming call is awaiting him. The indicator 92 will also preferably include a visual device which will remain on as long as the identifying signal for the person is received by the associated transceiver.

Preferably the transceiver circuit is of the type which is normally off but which is actuated by receipt of an incoming signal in the same manner as is currently being employed in respect of remotely controlled television receivers. Thus the life of the power source employed will be greatly extended. This feature is optional, however, and it is equally possible to maintain the transceivers in actuated condition during the entire period that they are physically associated with particular persons.

Additionally to the above, the relay 88 is effective via line 94 to actuate an emitter 96 which generates and transmits a signal which also identifies the associated person only. Alternative to this arrangement, the emitter 96 may not generate its own signal but may simply be a relay for the signal received via antenna 78. The signal emitted by circuit 96 is not, however, immediately effective. In fact, until the person hearing the transceiver takes further action the transceiver is not any more effective than simply alerting the wearer to the fact that an incoming call has been received.

As has been indicated above, the duly alerted person may then arbitrarily select any one of the telephones distributed throughout the zone 10 in which he is operating. He will then approach the telephone and he will remove the receiver as is illustrated in FIG. 3.

Figures 3, 4:
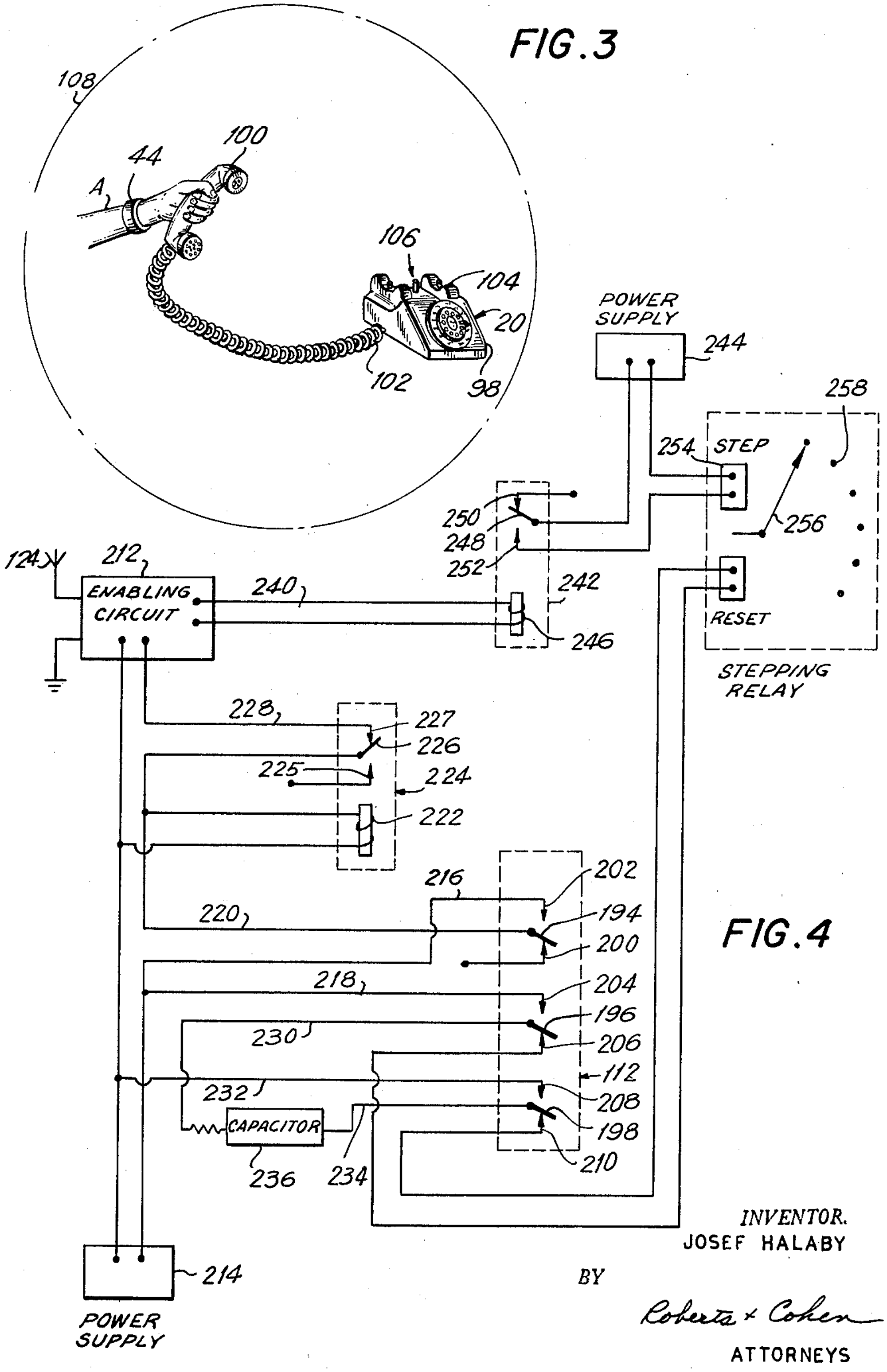
FIGURE 3 is a pictorial and diagrammatic illustration of a telephone in the process of being used by a person who has been alerted to an incoming telephone call.
FIGURE 4 is a partially diagrammatic and partially schematic illustration of an enabling means as employed with the aforesaid telephones and as connected to a selector device.

In FIG. 3 appears, for example, the telephone 20. It comprises, as is conventional, a base 98 and a receiver 100 connected to the base by a cord 102. Also conventionally included by the telephone 20 is the cradle 104. One modification of the telephone in respect of conventional telephones is the additional switch shown in the form of a depressible plunger 106. When the receiver 100 is removed by, for example, person A, who is wearing transceiver 44, the plunger 106 is actuated having been previously depressed and this begins the enabling operation for the telephone 20 as will be described. At the same time, it is to be noted that transceiver 44 (and all other transceivers like it) has a limited transmission range as indicated by the effective radius or circle of action indicated at 108. As will be shown when enabled by operation of plunger 106 telephone 20 will be capable of receiving a signal from the juxtaposed transceiver 44 which is employed to bring the proper telephone call to the telephone 20. The telephone 20 and transceiver 44, as well as the other telephones and transceivers, thus have a limited range of inductive coupling.

Referring back to FIG. 2, it is seen that telephones 18, 20 and 22 include switches 110, 112 and 114, of which the plunger or contact 106 was previously referred to in respect of FIG. 3. These switches enable telephones 18, 20 and 22 to transmit identifying signals to the selector 36 via lines 176, 178 and 180. It is further seen that telephones 18, 20 and 22 are provided with antennae 122, 124 and 126 respectively by means of which the aforesaid identifying signal is received from the juxtaposed transceiver.

Selector 36 is provided with sections 128, 130 and 132 shown by way of example to illustrate that one such section is provided for each telephone encompassed within the overall system. Section 128 is provided with an off set of contacts 134 and active sets of contacts 136, 138 and 140. Section 130 is provided with an off set of contacts 142 and with active sets of contacts 144, 146 and 148. Section 132 is provided with an off set of contacts 150 with active sets of contacts 152, 154 and 156. The number of active sets of contacts in each section correspond to the number of persons encompassed within the system.

Sections 128, 130 and 132 are provided with pairs of wipers 158, 160 and 162 respectively. Sections 128, 130 and 132 are moreover provided respectively with set contacts 164, 166 and 168 on the one hand, and reset contacts 170, 172 and 174 on the other. Signals received via set contacts 164, 166 and 168 will operate to step wipers 158, 160 or 162 along the active contacts of the different sections under the control of a signal such as will be received from telephones 18, 20 and 22 via lines 176, 178 and 180. A detailed description of this follows hereinafter. Signals received from telephones 18, 20 and 22, as will also be later described in greater detail, will operate through reset contacts 170, 172 and 174 to bring the wipers 158, 160 and 162 back to the off contacts 134, 142 and 150 respectively.

At this time, it should be noted that the incoming telephone call has been brought within central station 26 to a selected one of the sets of availability terminals 182, 184, or 186. This may be effected by an operator or in the automated manner heretofore conventionally employed for making incoming calls available to particular stations. In accordance with the invention, however, these availability or output terminals are related to persons instead of stations and are coupled via lines 188, 190 and 192 to respective of the aforesaid active contacts in sections 128, 130 and 132 wherefrom they are brought via one of the wipers 158, 160 and 162 to the actuated telephone 18, 20 or 22 and thence to the receiver thereof.

It will now be appreciated that, in the system which has been described, an incoming call intended for a particular person has been employed to alert that person to the fact that a telephone call is awaiting him whereafter that person's approach to a telephone is employed to bring the call to that specific telephone.

Referring now to FIG. 4, the switch 112 of telephone 20 is next described by way of illustration. It actually comprises a plurality of switchblades 194, 196 and 198 respectively effective between pairs of contacts 200 and 202, 204 and 206, and 208 and 210. Antenna 124 of telephone 20 is connected with an enabling circuit 212 for which power is supplied by a power supply 214. Power supply 214 is connected via lines 216 and 218 to contacts 202 and 204 respectively. Blades 194, 196 and 198 are actuated simultaneously upon release of plunger 106 of telephone 20 (see FIG. 3). When the receiver is lifted, blade 194 connects line 220 to line 216 and thus couples power supply 214 to blade 226 of relay 224 and to coil 222 of delay relay 224. At this point, relay 224 is not yet operated and blade 226 is at contact 227, thus coupling power supply 214 to enabling circuit 212 via lines 228 and 220. When delay relay 224 operates (after a certain time $t_0$), blade 226 is brought to contact 225. This cuts the power supply 214 connection to the enabling circuit 212. At the same time, line 218 is connected via blade 196 to line 230 and line 232 by blade 198 to line 234 whereupon the DC voltage of power supply 214 is connected across capacitor 236. This has the effect of charging capacitor 236 to perform a function hereafter described in greater detail.

Delay relay 224 is a known type of relay which has its operation deferred by a fixed period of time $t_0$.As a result, the power supply 214 is connected to enabling circuit 212 which consequently operates for a fixed period of time $t_0$ determined by the characteristics (delay time) of relay 224.

Figure 6:
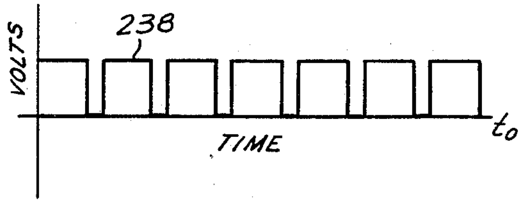
FIGURE 6 is a signal chart illustrating one type of identifying signal which can be employed in accordance with the invention.

The identifying signal which has been referred to hereinabove is illustrated in FIG. 6 wherein appears a chart of time versus volts, the time having the duration $t_0$ referred to immediately above. The identification or identifying signal may be the same throughout the entire system and may be, for example, unchanged when transmitted via antennae 34, 78 and 124 and emitter 96 and so forth. The signal can, of course, be altered as it follows the previously described path but for purposes of simplicity it will, in this text, be assumed to be unchanged. Transmission of identification signals between antennas 36 and 78 is effected with a modulation carrier. Transmission of identifying signals between emitter 96 and antenna 124 is by direct induction means or by a different carrier.

From FIG. 6, it is seen that the signal consists of a plurality of pulses 238 having a duty signal which is greater than the intervals between the pulses. According to the frequency of these pulses, there will be a greater or lesser number of these pulses occurring within time $t_0$. The number of pulses occurring within the fixed time identifies the person for whom the call is intended. Thus, person A may have an identifying signal consisting of 10 pulses, person B may have an identifying signal consisting of 20 pulses, and so forth.

Referring back to FIG. 4, it will now be noted that enabling circuit 212 transmits the identifying signal or its equivalent via lines 240 to a relay 242 having a power supply 244. Armature 246 of relay 242 switches blade 248 between contacts 250 and 252 connected to the stepping contacts 254 which are the diagrammatic equivalents of the step contacts 164, 166 and 168 of FIG. 2. This operates to step wiper 256 along contacts 258 in the manner previously noted in respect of sections 128, 130 and 132 in FIG. 2. As a consequence thereof, the enabling circuit 212 is effective through relay 242 to bring the call for the identified person into the telephone which has been actuated or enabled by the alerted person.

It is to be noted that when plunger 106 of telephone 20 returns to its original position condenser 236 discharges and operates the reset of sections 128, 130 or 132 of selector 36.

Figure 7:
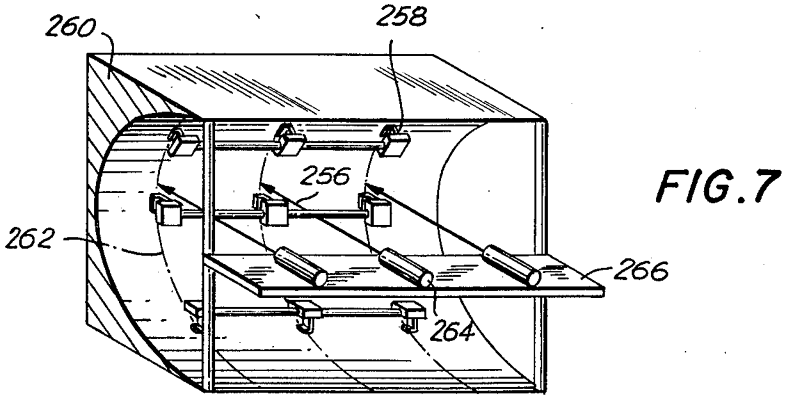
FIGURE 7 is a diagrammatic perspective view of an electromechanical selector which can be employed in accordance with one embodiment of the invention.

FIG. 7 illustrates diagrammatically an electromechanical selector, the use of which is envisaged. This selector comprises a block 260 of insulating material in which the active contacts 258 of the selector are embedded. The contacts are electrically connected in the various horizontal alignments. Wiper blades 256 are moved along imaginary paths 262 in such a manner as to make selective engagement with said active contacts. Wipers 256 are controlled by means of stepping relays 264 mounted on an insulating support 266.

Although various forms of electromechanical selectors may be employed according to what has been described above, as well as with reference to well-known analog systems having a physical response to an electrical control signal, it is to be noted that electrical systems such as matrices may also be readily employed within the scope of the invention. Assuming, for example, sets of availability contacts 268, 270 and 272 (FIG. 8) for persons X, Y and Z and telephones 274, 276 and 278 at which calls may be received by persons X, Y and Z, a matrix can be formed of lines 280, 282 and 284 on the one hand, and 286, 288 and 290 on the other hand. A pair of gates will be provided between the various intersections of the matrices. Let it be assumed, for example, that a call is to be transferred from availability contacts 270 to telephone 276 for person Y. In this case, appropriate control signals received by gate 292 will be effective to switch gate component 294 to admit through the same the incoming call which will be transmitted via lines 296 and 298 to telephone 276. The construction of diode gating systems and matrices to accomplish this end is well-known to those skilled in the art and need not be further explained in this text.

Figure 8:
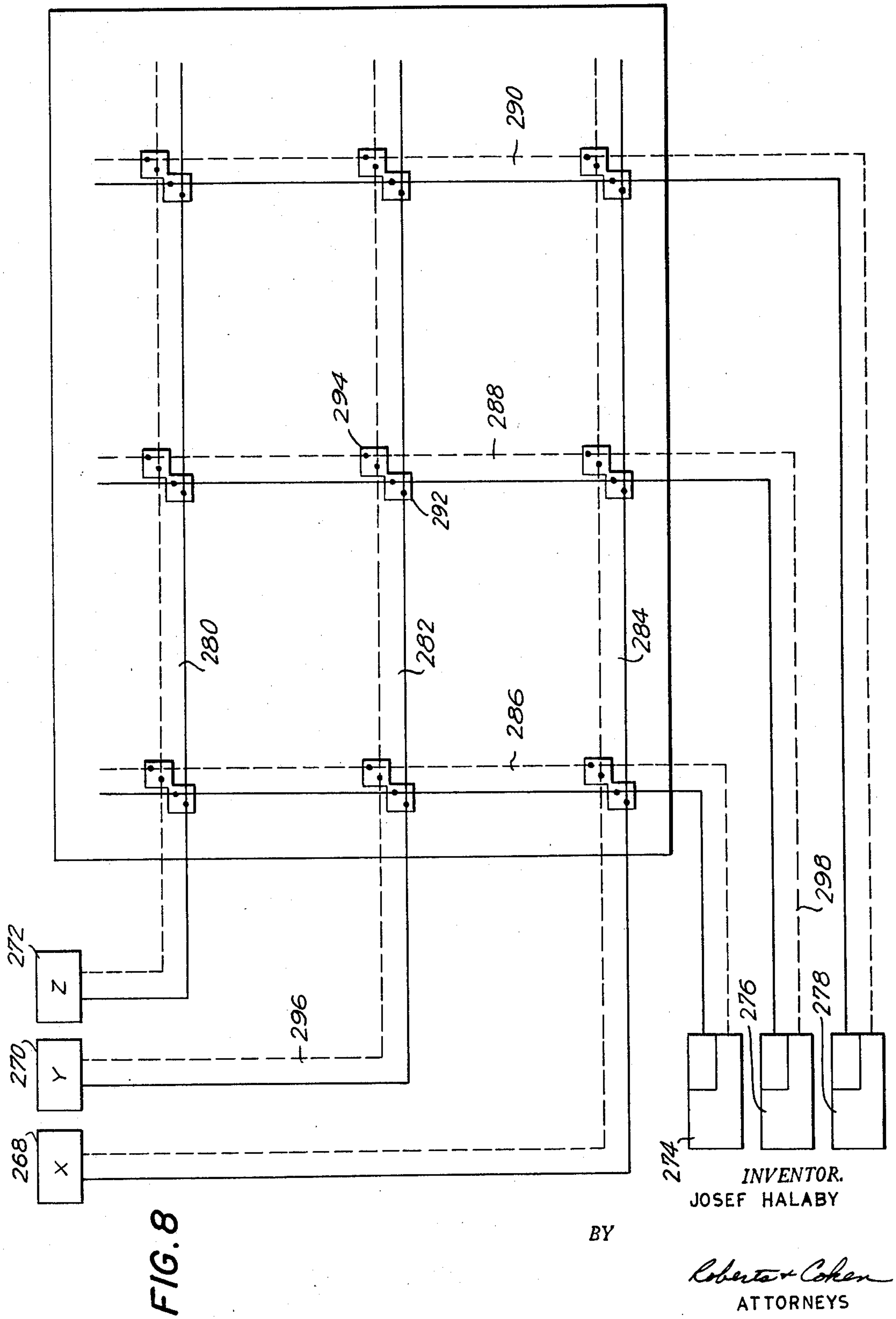
FIGURE 8 is a diagrammatic illustration illustrating an electronic matrix which can be employed as a selector in accordance with the invention.
Figure 9:
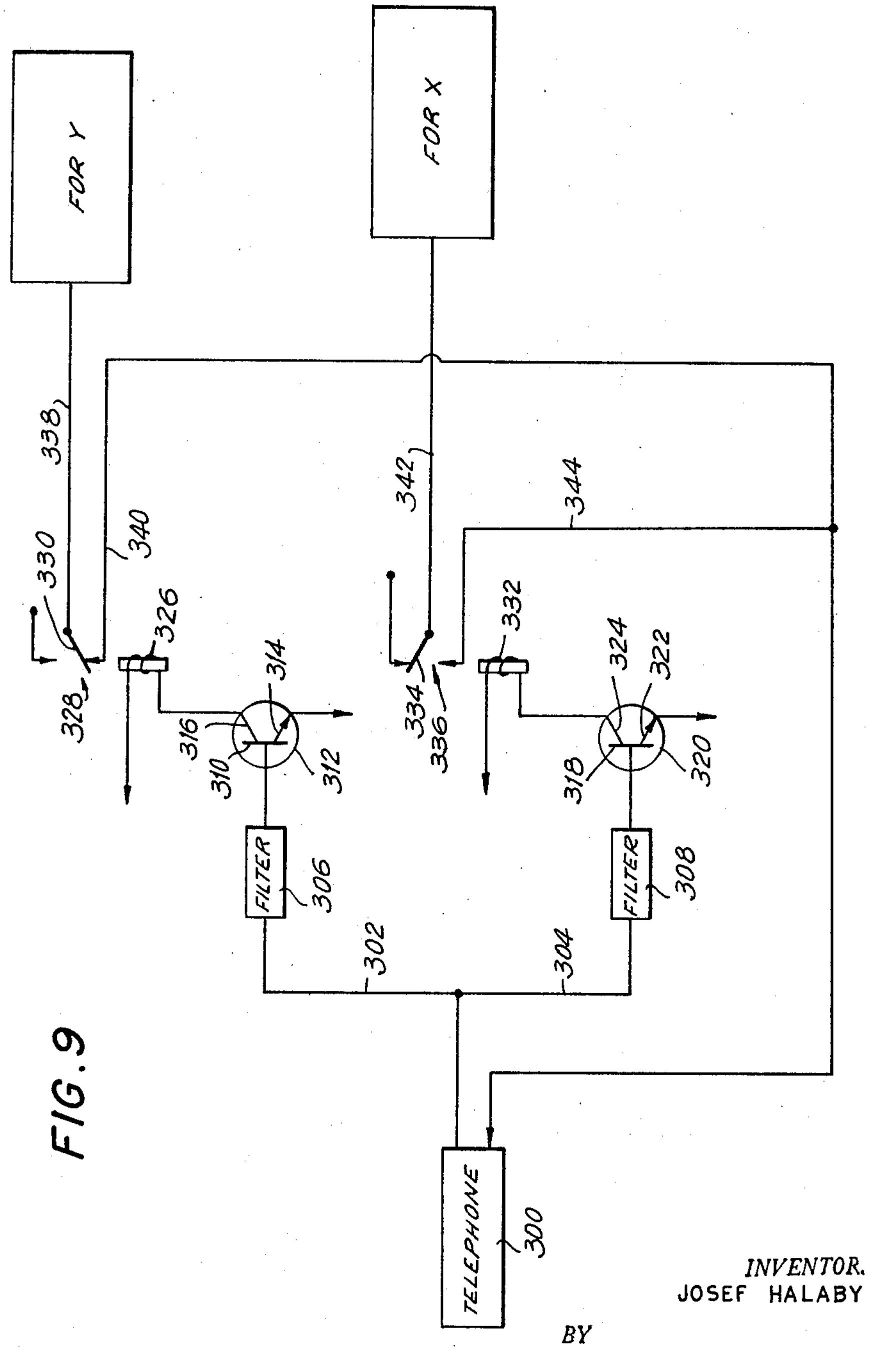
FIGURE 9 is a partially diagrammatic and partially schematic illustration of a section of an electronic matrix such as illustrated in FIG. 8 but illustrative of a modification thereof.

FIG. 9 illustrates a variation of the matrix arrangement of FIG. 8 in that identifying signals from both the availability contacts and telephones are not required, it being sufficient that the switching elements of the matrix receive a signal of a certain frequency characteristic from the related telephone.

More particularly, FIG. 9 illustrates a telephone 300 connected via lines 302 and 304 to filters 306 and 308 respectively. This number of filters is arbitrarily selected for purposes of illustration, it being understood that the number of filters will vary according to the number of persons for whom calls can be expected.

Filter 306 is connected, for example, to base 310 of a transistor 312 having an emitter 314 and a collector 316. Filter 308 is connected to base 318 of a transistor 320 having an emitter 322 and a collector 324. The collector 316 is connected to an armature 326 of relay 328 to operate the switchblade 330 thereof. Emitter 324 is connected to armature 332 to operation of blade 334 of a relay 336. Blade 328 is, for example, connected to a line 338 adapted to receive telephone calls for Y, and this blade is adapted for being coupled to line 340 which is coupled to telephone 300. Similarly, blade 334 is connected to a line 342 adapted to receive telephone calls for person X, the blade 334 coupling line 342 to line 344 so that telephone calls for person X can be transferred to telephone 300.

From the above description it will be obvious that there are numerous variations and modifications which are possible in respect of the circuits and arrangements described. Accordingly, this invention is not limited to the particular embodiments described, but only as to be applied from the following claims.

What is claimed is:

1. A communication system comprising a central station adapted for receiving incoming calls intended for specific persons and for transmitting signals identifying persons for whom incoming calls have been received, a plurality of telephone means distributed throughout a zone in which said persons can be located, a plurality of transceiver means physically associated with and transportable with respective of said persons and responsive to the identifying signals for indicating to the associated persons that an incoming call has been received for him, and a plurality of enabling means respectively associated with said telephone means and responsive to the transceiver means of the person for whom said call have been received for connecting the associated telephone means with said central station, said enabling means and transceiver means having a limited range of coupling so that the enabling means can respond to the receiver means only when the latter are brought within said range.

2. A system as claimed in claim 1 wherein each said telephone means includes switch means for actuating the associated enabling means and in turn adapted for being actuated by the person for whom the call has been received.

3. A system as claimed in claim 1 wherein said central station includes availability means each related to a person for whom a call may be received and which determine if a person is free to receive a call, said system further including selector means associated with respective of said telephone means and enabling means and selectively actuated by the latter to couple the associated telephone means to the availability means of the person identified by the identifying signal.

4. A system as claimed in claim 3 wherein the transceiver and enabling means have effective coupling ranges of no more than about ten feet and no less than about one foot.

5. A system as claimed in claim 3 wherein said transceiver means each includes audio indicator means.

6. A system as claimed in claim 3 wherein said transceiver means each includes visual indicator means.

7. A system as claimed in claim 3 wherein said selector means is an electro-mechanical device.

8. A system as claimed in claim 3 wherein said selector means is an electronic matrix.

9. A system as claimed in claim 3 wherein each said enabling means includes a timing means establishing a fixed period for the transmission of a control signal to said selector means and wherein said enabling means transmit pulses to said selector means during said period.

10. A system as claimed in claim 3 comprising wireless transmission means for transmitting identifying signals from said central station means to said transceiver means.

11. A system as claimed in claim 3 comprising lines coupling said enabling means to said selector means for the transmission of control signals and communications therebetween.

12. A system as claimed in claim 3 wherein said selector means is an electrical matrix including gate means actuated by signals from said central station and enabling means to pass incoming calls from the central station means to the telephone means.

13. A system as claimed in claim 3 wherein said selector means is an electrical means responsive to the frequencies of signals received from the enabling means to couple a selected telephone means to said central station means.

14. A system as claimed in claim 13 wherein said electrical means includes a matrix of transistors, filters coupled between said transistors and said enabling means, and connecting means between said telephone and central station means, said filters selectively biasing said transistors to actuate said connecting means.

15. A system as claimed in claim 3 comprising means connecting said telephone means directly to said central station so that calls can be made between said telephone means.

References Cited

UNITED STATES PATENTS 2,957,047 10/1960 Wennemer.

OTHER REFERENCES

N. Monk and E. D. Guernsey, Personal Signalling, a New Telephone Service, 1958 Wescon Convention Record, vol. 2, pp. 76–83.

KATHLEEN H. CLAFFY, Primary Examiner

J. S. BLACK, Assistant Examiner